United States Patent
Soltendieck et al.

(10) Patent No.: US 7,669,543 B2
(45) Date of Patent: Mar. 2, 2010

(54) DISPLAY DEVICE FOR A MOTOR VEHICLE

(75) Inventors: Bernd Soltendieck, Braunschweig (DE); Robert Hofmann, Berlin (DE); Gustav Hofmann, Braunschweig (DE); Andreas Medler, Lengede (DE); Mathias Kuhn, Berlin (DE); Michael Bauer, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 890 days.

(21) Appl. No.: 10/565,865

(22) PCT Filed: Jun. 8, 2004

(86) PCT No.: PCT/EP2004/006156

§ 371 (c)(1), (2), (4) Date: Jul. 24, 2006

(87) PCT Pub. No.: WO2005/018976

PCT Pub. Date: Mar. 3, 2005

(65) Prior Publication Data

US 2006/0278155 A1 Dec. 14, 2006

(30) Foreign Application Priority Data

Jul. 23, 2003 (DE) ................. 103 33 745

(51) Int. Cl.
*G01P 5/00* (2006.01)
*G09G 5/00* (2006.01)
*B60Q 1/00* (2006.01)

(52) U.S. Cl. .............. 116/62.4; 345/4; 345/7; 340/461

(58) Field of Classification Search ......... 359/466–477; 353/7; 348/42–60; 345/4–9
See application file for complete search history.

(56) References Cited

U.S. PATENT DOCUMENTS

| 4,636,782 A | * | 1/1987 | Nakamura et al. ............. 345/7 |
| 5,121,099 A | * | 6/1992 | Hegg et al. ................. 340/461 |
| 5,161,480 A | | 11/1992 | Furuya et al. |
| 5,278,532 A | | 1/1994 | Hegg et al. |

(Continued)

FOREIGN PATENT DOCUMENTS

DE  1 623 738  1/1971

(Continued)

OTHER PUBLICATIONS

European Search Report dated Aug. 11, 2008, European Patent Application No. 07010589.5 (English-language translation provided).

*Primary Examiner*—Sumati Lefkowitz
*Assistant Examiner*—Charles Hicks
(74) *Attorney, Agent, or Firm*—Kenyon & Kenyon LLP

(57) ABSTRACT

A display device for a motor vehicle, e.g., an instrument cluster, includes at least one first display device emitting image-forming light, and at least one illuminated and/or self-luminous electromechanical second display device. The first display device is arranged in a visual field of an observer. The second electromechanical display device is arranged at an angle to the first display device, and a combination element is provided between the first display device and the electromechanical display device, the combination device being transparent to the image-forming light in the first display device and reflective to the image-forming light of the electromechanical second display device.

24 Claims, 3 Drawing Sheets

U.S. PATENT DOCUMENTS

| | | |
|---|---|---|
| 5,576,886 A | 11/1996 | Ferrante |
| 6,317,037 B1 * | 11/2001 | Ayres et al. .................. 340/461 |
| 6,337,672 B1 | 1/2002 | Inoguchi et al. |
| 6,750,832 B1 * | 6/2004 | Kleinschmidt .................. 345/7 |
| 2001/0048403 A1 * | 12/2001 | Tsuji ............................ 345/7 |
| 2002/0085043 A1 | 7/2002 | Ribak |

FOREIGN PATENT DOCUMENTS

| | | |
|---|---|---|
| DE | 41 16 903 | 12/1991 |
| DE | 41 26 148 | 2/1992 |
| DE | 94 03 940.2 | 5/1994 |
| DE | 43 23 082 | 1/1995 |
| DE | 44 07 855 | 8/1995 |
| DE | 44 34 443 | 3/1996 |
| DE | 199 02 136 | 8/1999 |
| DE | 198 14 904 | 10/1999 |
| DE | 199 03 202 | 8/2000 |
| EP | 0 482 805 | 4/1992 |
| EP | 0 853 015 | 7/1998 |
| EP | 1 052 133 | 11/2000 |
| EP | 2002079848 | 3/2002 |
| FR | 2 727 559 | 5/1996 |
| GB | 2 244 569 | 12/1991 |
| GB | 2 248 335 | 4/1992 |
| JP | 63-232042 | 9/1988 |
| JP | 3-273942 | 12/1991 |
| JP | 05 107270 | 4/1993 |
| JP | 2002-79848 | 3/2002 |
| WO | WO 89/02611 | 3/1989 |
| WO | WO/9922960 | 5/1999 |
| WO | WO 03/016086 | 2/2003 |

\* cited by examiner

DISPLAY DEVICE FOR A MOTOR VEHICLE

FIELD OF THE INVENTION

The present invention relates to a display device for a motor vehicle, e.g., an instrument cluster, having at least one first freely programmable display device, which emits image-forming light, and at least one illuminated or self-luminous electromechanical second display device, e.g., at least one pointer instrument.

BACKGROUND INFORMATION

The quantity of information or data that is indicated to a driver because of the increasing number of convenience devices, such as navigational devices, telecommunications devices, driver assistance systems and desired warning indications, etc., is increasing steadily. In many vehicles, therefore, so-called multi-function operating devices are already being installed which, for example, are situated in the center console. In the case of this arrangement, in order to receive the information, the driver is forced to avert his view from the traffic happenings. For this reason, it may be of advantage to indicate at least a portion of the data in the instrument cluster that is located in the driving direction, in the field of view of the vehicle's driver. In that case, the problem may arise that only a certain indicating area in the instrument cluster is available, besides the analog display elements for vehicle speed, rotary engine speed, etc.

For this reason, people are working on new concepts, for instrument clusters, which are able to reproduce a larger quantity of data, without having to do without the usual analog display instruments.

A display device is described in European Published Patent Application No. 0 482 805, in which a first and a second image source are provided. The imaging illumination of the first image source is reflected to the observer by a planar combining device and two additional mirrors located in the beam path of the reflected light.

The image-forming illumination of the second image source is, in this context, transmitted by the combining device, and is then also reflected to the observer by the two mirrors. In this context, the first image source may have a group of electromechanical display devices, such as of speed, oil pressure, tank level, and, for example, display lights, such as directional signals, high beam and emergency indicators. The second image source is a liquid crystal display for making available alphanumeric data, such as messages, maintenance instructions and settings for the environment. In conventional display device, neither of the two image sources is in the direct field of view of the driver, so that a purely virtual image is created. Furthermore, it may be difficult to get a grip on the parallaxes created by the differently situated image sources and the multiple reflections of the image-forming light of the image sources, such that no image distortions are created.

Moreover, Japanese Published Patent Application No. 2002-79848 describes an instrument cluster for a motor vehicle having a conventional electromechanical display device, in whose display image, via a concave, semitransparent mirror, which is designed to let through the image-forming light of the electromechanical display device, a virtual image of a display device, that is not situated in the field of view of the driver, is reflected in. With the aid of this display device, however, one is not able to solve the problem, compared to conventional display devices, of showing, in a manner that is quickly assimilated, a larger quantity of different data to the driver, since space has to be provided in the electromechanical display device for the reflected image of the display device.

SUMMARY

An example embodiment of the present invention may provide a display device for a motor vehicle with the aid of which a larger quantity of data may be shown in different display modes in a clear fashion.

According to an example embodiment of the present invention, the first freely programmable display device, which may be a liquid crystal display, an OLED display or any other display device, etc., is arranged in the field of view of the observer. A second electromagnetic display device, which has display elements of a usual instrument cluster, such as dial-type gages for showing speed, is arranged at an angle to the first display device outside the field of view of the driver while he is engaged in driving. Between the first display device and the electromagnetic second display device, a combining device is arranged such that it brings together the image-forming light of the first display device and the electromagnetic second display device to a common display image, the combining device being made so as to transmit the image-forming light of the first display device, and is furthermore arranged such that it reflects the image-forming light of the electromagnetic second display device.

According to an example embodiment of the display device, it is constructed such that the sum of the reflections of the image-forming light of the first display device and the electromagnetic second display device is at most four, and, e.g., at most two, whereby the problem of image distortion may be minimized. The angle between the first display device and the electromagnetic second display device may be formed by respectively one center axis of the first display device and the second electromechanical display device. In this context, the electromechanical display device may be arranged lying down below the field of view.

At least the display-effective area of the electromechanical second display device, in common with the combining device, may be arranged at a distance from the display surface of the first display device, so that the display image of the electromechanical display device, independently of whether it emits completely or partially image-forming light, is projected virtually at a distance from the display area of the display device, so that virtually, at least partially, a three-dimensional image is generated. The distance at which the display image of the electromagnetic display device is virtually arranged in front of the display of the first display device is determined by the magnitude of the distance of the combining device from the display-effective area of the electromagnetic display device.

The angle between the first display device and the electromechanical second display device is less than 180°, and may be in the range between 75° and 120°. An angle of 90° may be particularly advantageous.

In order to minimize distortions, it may be provided that the combining device essentially halves the angle between the first display device and the electromagnetic second display device. At an angle of 90° between the two display devices, it is situated at an angle of 45° with respect to the two display devices.

The combining device may be a partially or semitransparent mirror, which is designed to transmit the display image of the first display device and is designed to reflect the display image of the electromechanical second display device.

Furthermore, it may be provided that the display image of the display device is formed, in at least one display mode, by the superposition of the display image of the first display device, and by the reflected image-forming light of the electromechanical display device.

In at least one display mode of the display device, the image-forming light of the electromechanical second display device forms at least one dial-type gage having, e.g., at least one pointer representation, by the illumination or the self-luminous activation of at least one dial-type gage. If the pointer is activated illuminated or self-luminous only partially within the area of the dial of the dial-type instrument, the area of the dial-type instrument formed by the image-forming light may be used in the display image of the display device by the display image of the first display device for showing the information.

In at least one display mode, only one or several parts of the electromechanical second display device may be activated in a manner able to be illuminated and/or self-luminous.

Besides the at least one dial-type instrument, the electromechanical second display device may additionally have controllable warning displays, e.g., luminous area displays, such as for blinkers, high beam and/or warning lights.

The electromechanical second display device may have at least one first measured quantity display, e.g., a speed display, e.g., a dial-type instrument, which is situated in a main area of the electromechanical second display device. Furthermore, in the electromechanical display device there is provided at least one second display of the same measured quantity, e.g., a speed display, e.g., also a dial-type instrument, which is situated in a lateral area of the electromechanical display device. In at least one display mode of the display device, the first measured quantity display is shown, and, in at least one additional display mode, the second measured quantity display is shown.

The second measured quantity display may be smaller than the first measured quantity display, e.g., it is at most ¾ of the size, however, e.g., at most ½ the size of the first measured quantity. This may provide that, in the display modes in which the display image of the second measured quantity display is shown, the greatest part of the display image of the display device is able to be used for the display image of the first display device.

In the at least one display mode in which the display image of the second measured quantity display is shown, in the area of the first measured quantity display, essentially only the display image of the first display device is shown. Similar measured quantity displays may also be implemented for other measured quantities, such as the rotary engine speed of the vehicle.

The display device may be arranged as a so-called instrument cluster, which is situated in the motor vehicle in the line of view of the driver.

Example embodiments of the present invention are described in greater detail below in the following description with reference to the appended Figures.

DETAILED DESCRIPTION

Figure 1:
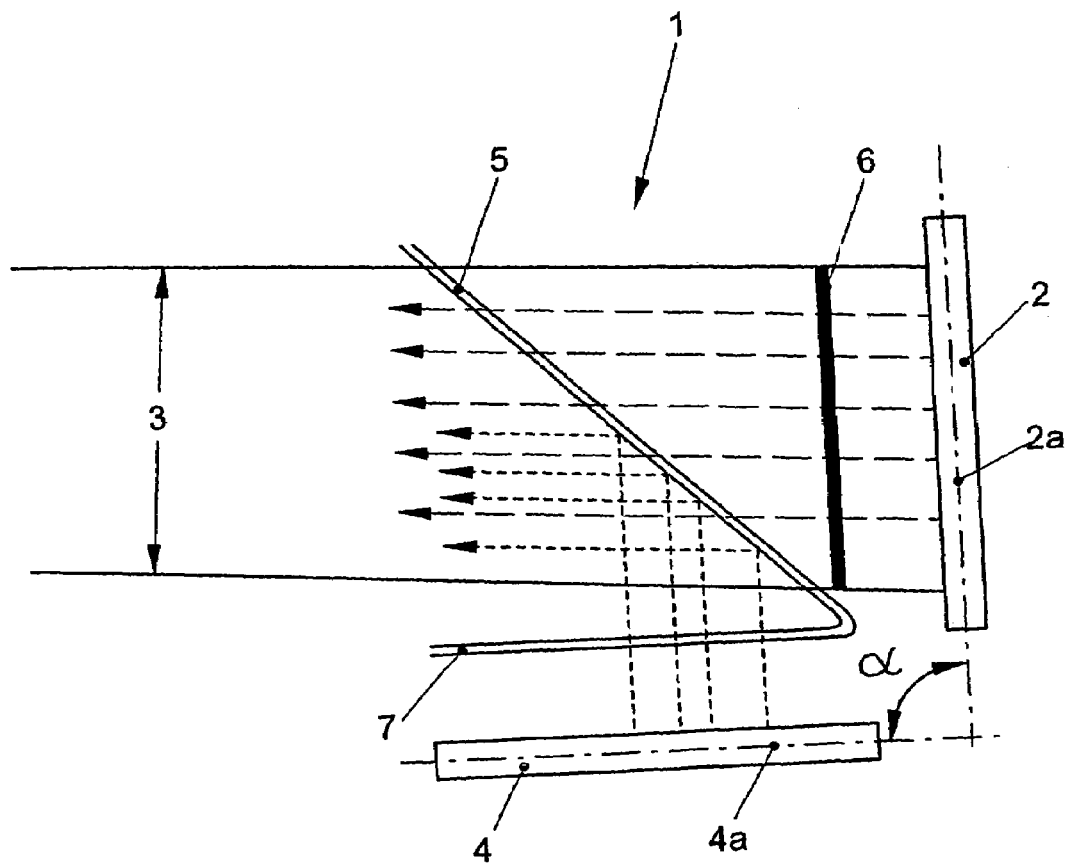
FIG. 1 is a schematic view of a display device according to an example embodiment of the present invention.

Display device 1, illustrated in FIG. 1 for an instrument cluster of a motor vehicle, is made up essentially of a first display device 2, which is located in the direct field of view 3 of the vehicle's driver, in the region of a steering wheel, when he is driving the motor vehicle, and an electromechanical second display device 4, which, in the exemplary embodiment, is situated lying down below field of view 3 of the vehicle's driver. Electromechanical second display device 4 may, in this context, be designed like a usual instrument cluster, having several dial-type instruments, whose scales are made self-luminous or illuminated, and have an illuminated or self-luminous pointer for pointing out the current value. Furthermore, the electromechanical display device may have one or more luminous area displays for warning displays or warning lights.

Center axes 2a and 4a of first display device 2 and electromechanical second display device 4 may be situated at an angle α of 90° to each other. At an angle of 45° from electromechanical display device 4, a combination device 5 is provided. In the exemplary embodiment this is a planar, semi-transparent mirror, which is designed to transmit the image-forming light of first display device 2, so that a viewer may directly perceive the display image of the display device. The image-forming light of electromechanical display device 4 is reflected by semitransparent mirror 5, so that, to a viewer, it appears as a virtual image 6, arranged in front of the display image of display device 2. In the exemplary embodiment, above electromechanical second display device 4, a screen 7, made of semitransparent material, is provided, which is designed to transmit the image-forming light of display device 4, and which covers electromechanical display device 4, as far as the viewer is concerned, at least in the switched off state.

Figure 2:
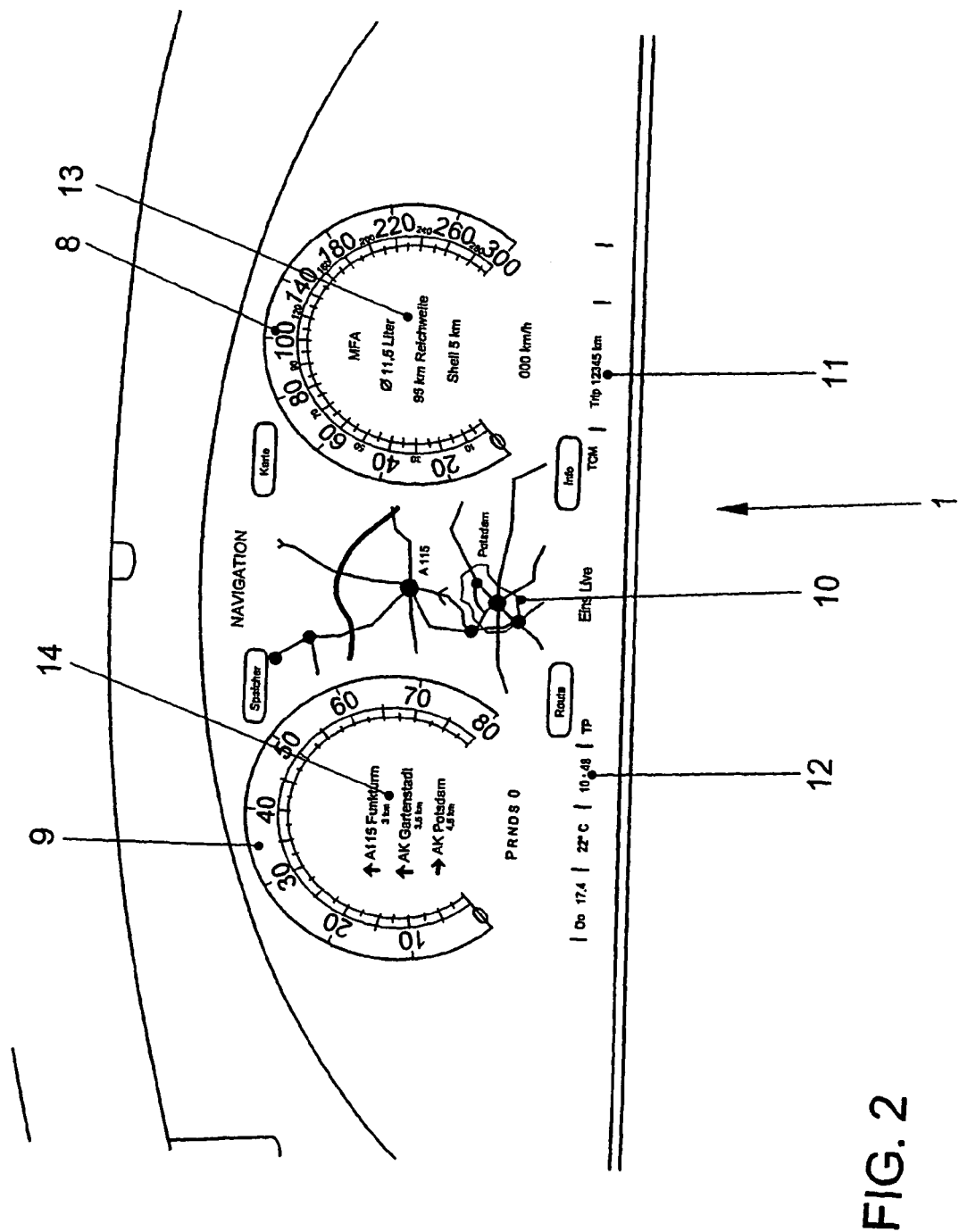
FIG. 2 illustrates a display image of the display device.
Figure 3:
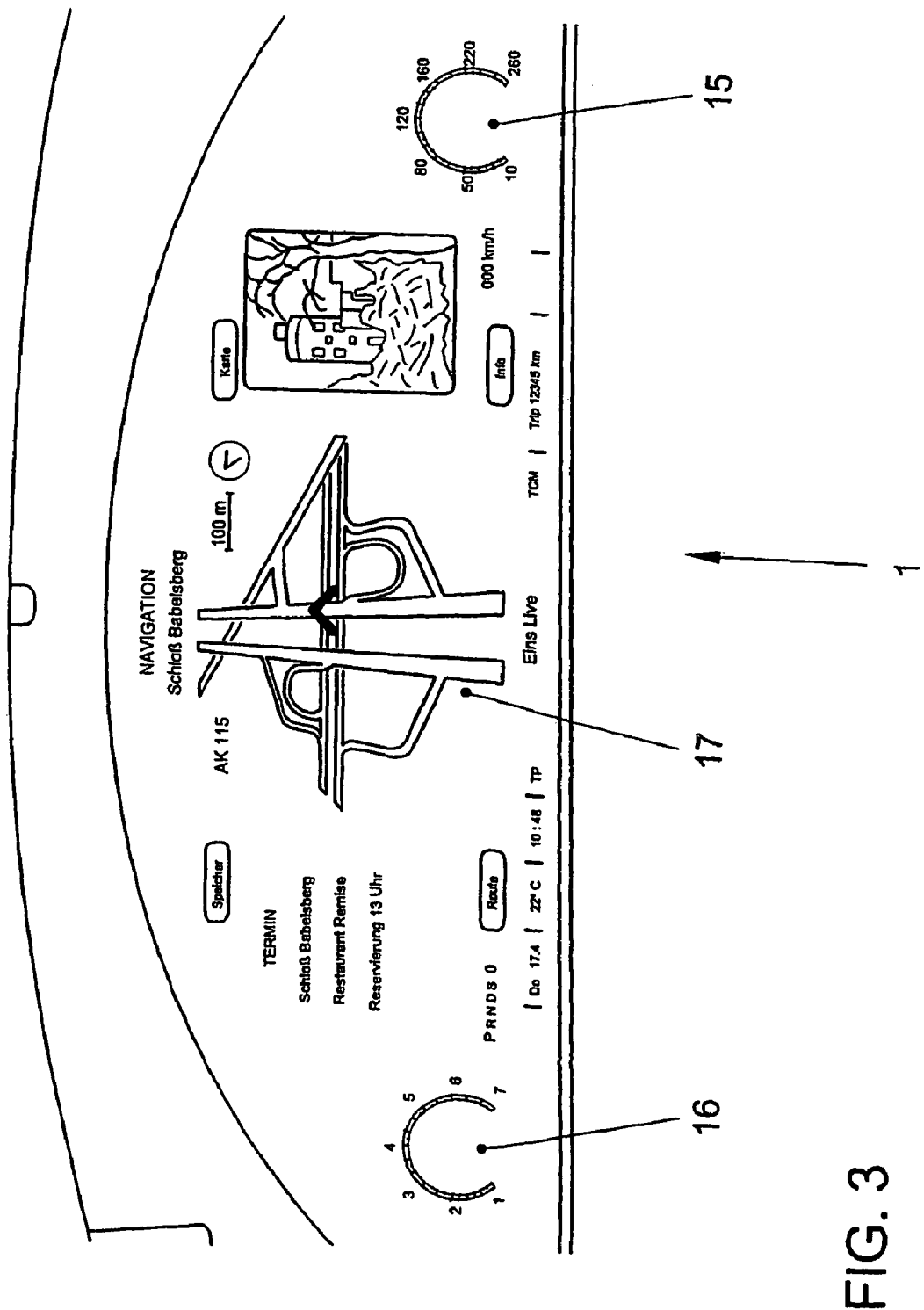
FIG. 3 illustrates a further display image of the display device.

FIGS. 2 and 3 illustrate possible display images of display device 1.

In FIGS. 2 and 3, the display image is composed of display image parts which come from first display device 2 and from electromechanical second display device 4. It is possible, however, for a display image to be formed completely by a display image of display device 2 or display device 4. FIG. 2 illustrates dial-type instruments 8, 9 for travel speed and engine rotary speed by image-forming light of electromechanical second display device 4. The other display elements 10 to 12, including alphanumeric displays 13, 14 originate from first display device 2. In the display image illustrated FIG. 3, dial-type instruments 8, 9 of electromechanical display device 4 of FIG. 2 are blanked out, or rather, dial-type instruments 8, 9 are not illuminated or activated in a self-luminous manner. Thereby, the main area of the display image of display device 1 is available for display image 17 of display device 2. In the edge area of electromechanical second display device 4, smaller dial-type instruments 15, 16 are activated, illuminated or self-luminous, to indicate the travel speed and the engine rotary speed, so that these dial-type instruments 15, 16 are arranged in front of display image 17 of display device 2 in the display image of display device 1. The display images illustrated in FIG. 2 and FIG. 3 are here given only in exemplary fashion. The implementation of the most varied display images of display device 1 is possible, having the same and also other display elements.

What is claimed is:

1. A display device for a motor vehicle, comprising:
   at least one first display device adapted to emit image-forming light, the first display device arranged in a direct visual field of an observer;
   at least one of (a) an illuminated and (b) a self-luminous electromechanical second display device arranged below the first display device, the first display device and the second display device arranged at an angle to each other, the second display device including at least one mechanical pointer instrument; and
   a combination device arranged between the first display device and the second display device, the combination device transparent to the image-forming light of the first display device and reflective to image-forming light of the second display device.

2. The display device according to claim 1, wherein the display device is arranged as a instrument cluster of the motor vehicle.

3. The display device according to claim 1, wherein a sum of reflections of the image-forming light of the first display device and the image-forming light of the second display device is at most 4.

4. The display device according to claim 1, wherein a sum of reflections of the image-forming light of the first display device and the image-forming light of the second display device is at most 2.

5. The display device according to claim 1, wherein the angle is formed by a center axis of the first display device and the second display device.

6. The display device according to claim 1, wherein at least a display-effective area of at least one of (a) the second display device and (b) the combination device is arranged at a distance from the first display device.

7. The display device according to claim 1, wherein the angle is less than 180°.

8. The display device according to claim 1, wherein the angle is between 75° and 120°.

9. The display device according to claim 1, wherein the angle is 90°.

10. The display device according to claim 1, wherein the combination device is adapted to halve the angle between the first display device and the second display device.

11. The display device according to claim 1, wherein the combination device includes a partially transparent mirror transparent to the image-forming light of the first display device and reflective to the image-forming light of the second display device.

12. The display device according to claim 1, wherein in at least one display mode, a display image of the display device is at least one of (a) formable and (b) formed by a display image of the first display device and by the image-forming light of the second display device.

13. The display device according to claim 1, wherein in at least one display mode, the image-forming light of the second display device forms at least one dial instrument.

14. The display device according to claim 1, wherein in at least one display mode, the image-forming light of the second display device forms at least one dial instrument having an at least partial pointer presentation.

15. The display device according to claim 13, wherein in a display image of the display device, a representation of the at least one dial instrument appears to be optically arranged virtually in front of the display image of the display device.

16. The display device according to claim 1, wherein in at least one display mode, at least one part of the second display device is at least one of (a) able to be illuminated, (b) illuminated, (c) able to be activated and (d) activated.

17. The display device according to claim 1, wherein the second display device includes at least one of (a) controllable warning displays, (b) luminous area displays and (c) warning lights.

18. The display device according to claim 1, wherein the second display device includes at least one first measured quantity display arranged in a main area of the second display device and includes at least one second display for the same measured quantity arranged in a lateral area of the second display device, in at least one display mode, image-forming light of the first measured quantity display at least one of (a) reflectable and (b) reflected by the combination device, in at least one additional display mode, image-forming light of the second display of the same measured quantity at least one of (a) reflectable and (b) reflected by the combination device.

19. The display device according to claim 18, wherein the first measured quantity display includes at least one of (a) a first speed display and (b) a dial instrument.

20. The display device according to claim 18, wherein the second display includes at least one of (a) a second speed display and (b) a dial instrument.

21. The display device according to claim 18, wherein the second display of the measured quantity is smaller than the first measured quantity display.

22. The display device according to claim 18, wherein the second display of the measured quantity is at most ¾ of a size of the first measured quantity display.

23. The display device according to claim 18, wherein the second display of the measured quantity is at most ½ of a size of the first measured quantity display.

24. The display device according to claim 18, wherein in the at least one display mode, in an area of the first measured quantity display, one of (a) substantially only and (b) only a display image of the first display device is at least one of (a) showable and (b) shown on the display device.

* * * * *